March 10, 1964   G. B. LOPER ETAL   3,124,781
CONTINUOUS SEISMIC EXPLORATION
Filed May 4, 1959   5 Sheets-Sheet 5

United States Patent Office 3,124,781
Patented Mar. 10, 1964

3,124,781
CONTINUOUS SEISMIC EXPLORATION
George B. Loper, Dallas, Carroll D. McClure, Rockport, and Edward B. Simpson, Arlington, Tex., assignors, by mesne assignments, to Socony Mobil Oil Company, Inc., New York, N.Y., a corporation of New York
Filed May 4, 1959, Ser. No. 810,731
7 Claims. (Cl. 340—15.5)

This invention relates to continuous seismic exploration and more particularly to combining and recording seismic signals produced repetitively at uniform time and space intervals.

Advancements in the art of seismic exploration by reflection techniques have led from the detection at a few detecting stations of seismic waves resulting from detonation of a single explosive charge, to the use of a plurality of charges and large numbers of detectors. Such changes changes have been directed toward improvement in the signal-to-noise ratio and more accurately to delineate subsurface formations. In more recent operations, sources have been developed and recording techniques based thereupon which involve repetitive impact of a weight on the earth's surface at spaced points.

The present invention represents an improvement over the foregoing, particularly in operations where a seismic system is continuously moved during the course of seismic operations, the latter being primarily and most generally characteristic of operations in marine and marsh land environments.

More particularly in accordance with the present invention, seismic distrubances are generated preferably at uniformly spaced time intervals with one disturbance at each of a plurality of spaced apart locations along a traverse. The resultant seismic waves are detected at different points to produce time-separated signals. Each such signal is representative of seismic waves in a given seismic disturbance. Output signals are then produced by combining or compositing a plurality of time-separated signals in predetermined time relation with respect to the initiation of each disturbance. Each combination of such signals includes signals resulting from a predetermined sequence of the seismic disturbances, each sequence bearing the same relation with respect to the most recent disturbances. The output signals are then recorded in correlation with the locations of the points of generation of the seismic disturbances.

In a more specific aspect of the invention, the timeseparated signals which are combined to produce output signals are limited to a predetermined number of those signals which immediately precede the most recent disturbance.

In accordance with a further aspect of the invention, there is provided a seismic exploring system wherein a seismic source is adapted to be repetitively energized upon application thereto of a starting pulse. Detectors maintained in predetermined relation with respect to the source generate seismic signals corresponding to waves from the source. A recorder including a writing means is adapted cyclically to scan a recording medium and to generate a starting pulse for the seismic source in predetermined time relation with respect to each scanning cycle. A temporary storing medium is provided with a transducer connected to the detectors for impressing signals thereon. Reproducer means spaced along the temporary signal-storing medium multiply detect the stored signals. Driving means for the storing medium moves the same from one of said reproducer means to another in an interval preferably corresponding with the scanning interval of said recording medium. A combining network is employed for combining signals from the reproducer means and applying the same to the writing means whereby a visual representation of earth formations over which said system passes will be provided.

For a more complete understanding of the present invention and for further objects and advantages thereof, reference may now be had to the following description taken in conjunction with the accompanying drawings in which.

Figure 1A:
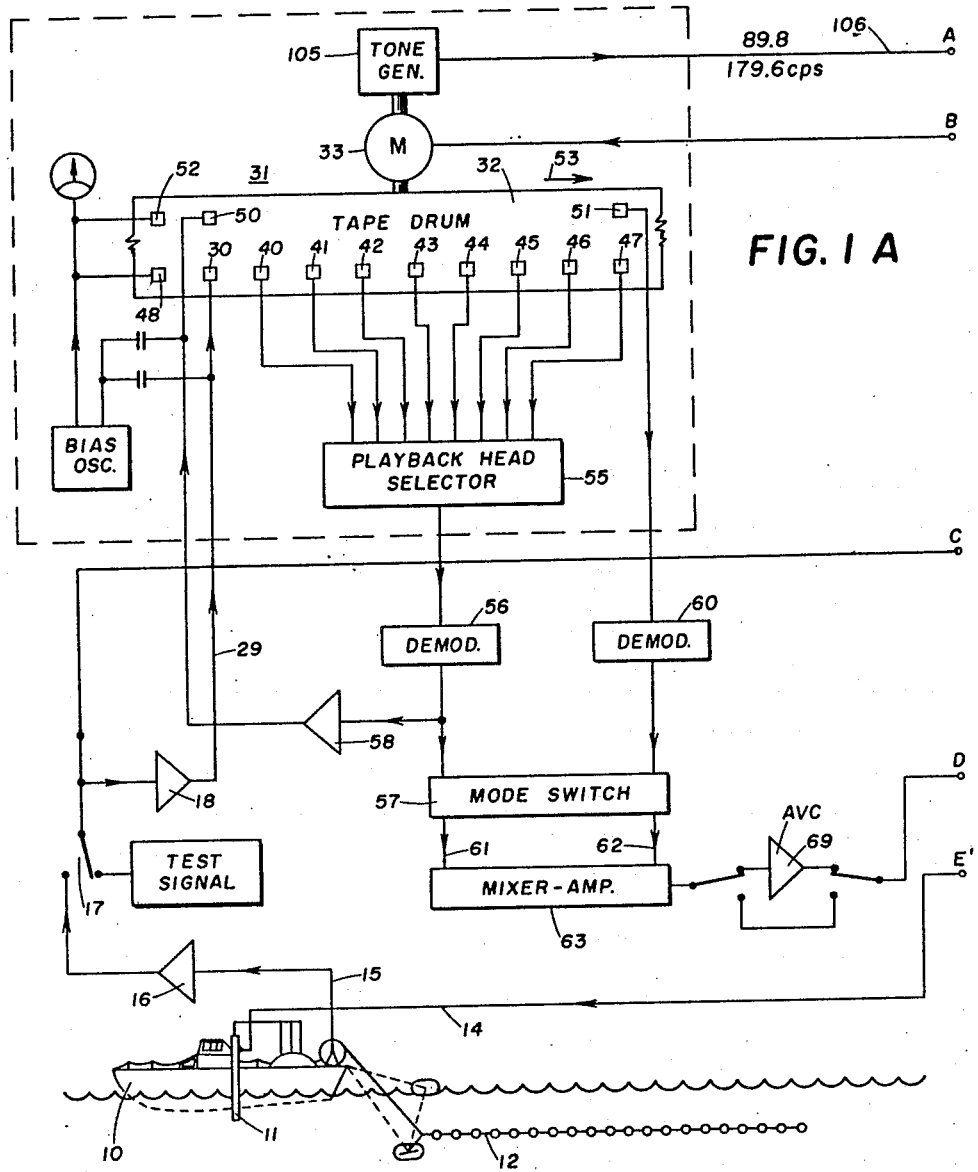
FIG. 1A is a block diagram of a portion of the system forming the present invention.
Figure 1B:
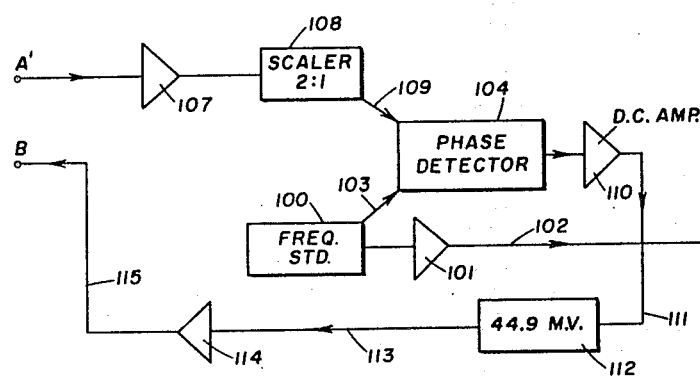
FIG. 1B is a block diagram of the remaining part of the system forming the present invention.
Figure 1B:
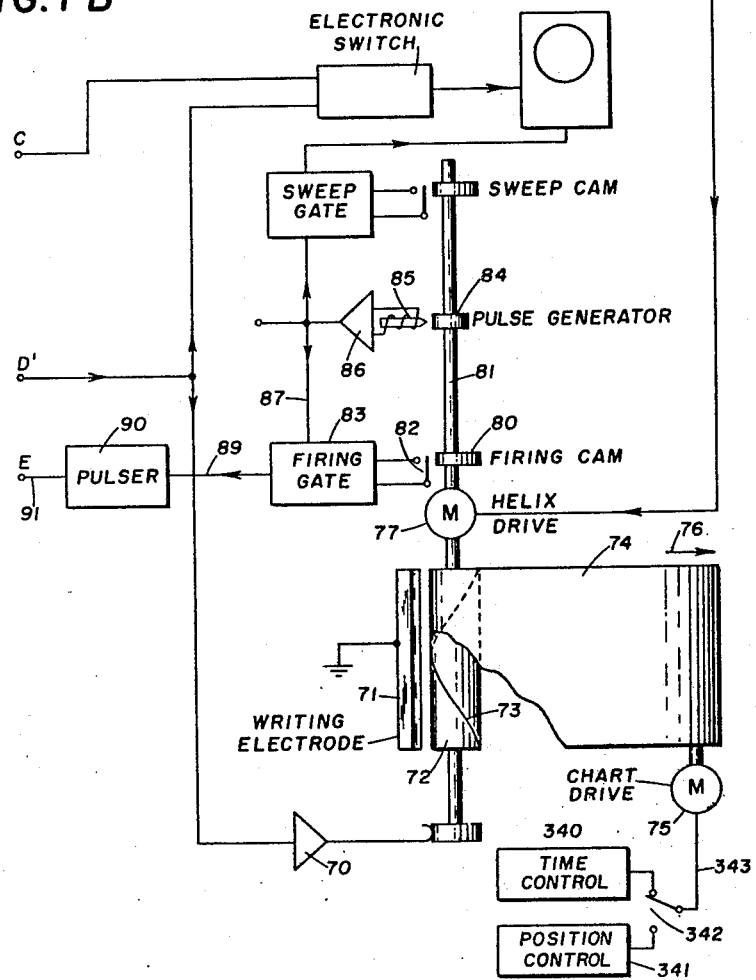

Referring to the system shown in FIG. 1A and FIG. 1B, a boat 10 supports a seismic source 11 and is adapted to tow a spread 12 of seismic detectors. The source 11 may conveniently comprise an elongated barrel having the muzzle thereof submerged in water. A combustible gas mixture flows through the source 11. Repeated generation of a spark discharge in the upper end of source 11 by application thereto of firing pulses on channel 14 initiates combustion of the gas mixture. As combustion proceeds downward, a detonation wave is produced. Upon impact thereof acoustic energy is transmitted into the water. While other forms of repetitive sources may be employed such as a spark gap or an electromechanical system, a detonation-type unit is preferred because the frequency of the acoustic signal is in a desirable range and relatively high level energy is available.

The acoustic waves then travel from the source 11 downwardly to subsurface reflecting horizons. The reflected seismic waves are then detected as they impinge spread 12. Electrical signals thus generated by seismometers in spread 12 are applied by way of channel 15 to a recording system.

As will hereinafter be described, the control pulses applied by way of channel 14 are uniformly spaced in time so that time-separated seismic signals repeatedly appear on channel 15. Preferably the operation is such that a seismic disturbance will be produced by source 11 at intervals of the order of about 3 seconds, permitting the resultant seismic waves to travel to beds of substantial depth. The time interval between successive seismic disturbances will depend upon the objectives of any given operation, the depth to which the subsurface is to be mapped and the detail with which a given section is to be portrayed.

Each of the time-spaced seismic signals appearing on channel 15 represents signals from one seismic disturbance. Such time-spaced signals are applied to a seismic amplifier 16 and then by way of an input selector switch 17 to a recording amplifier 18. The output of amplifier 18 is then applied by way of channel 29 to a recording head 30 of a temporary storing unit 31 which includes a magnetic storage drum 32. For convenience of illustration, the surface of the drum 32 has been illustrated in one plane so that the positional relationship of the several recording and detecting transducers may be more clearly illustrated. Drum 32 in the form illustrated has two recording channels or tracks, the first of which is associated with the recording transducer 30.

Associated with the first recording track are detector heads 40—47 and an erasing head 48. The reproducer heads 40—47 are uniformly spaced about the periphery of drum 32, the spacing being the same as between the recording head 30 and the detector head 40. The erase head 48 is positioned between the last reproducer head 47 and the recording head 30.

Cooperating with a second recording track on drum 32 is a recording head 50 and a reproducer head 51, positionally aligned with the recording head 30 and the last reproducer head 47 of Track 1, respectively. A second erase head 52 is positioned between the reproducer head 51 and the recording head 50.

Drum rotation is such that movement of the recording medium relative to the transducers is in the direction of arrow 53. The time-separated seismic signals from amplifier 18 are initially stored on the magnetic drum 32 by transducer 30. The drum 32 is driven by motor 33 at a speed such that a given point on the periphery thereof is moved during the time interval between each of the control pulses on channel 14 a distance equal to the spacing between the transducers 30 and 40. Operation of the unit illustrated in FIG. 1A, containing eight reproducer heads on Track 1, will result in simultaneous application of eight signals to the playback selector 55. The eight signals are the most recent signals relative to any given disturbance generated by source 11. After detection by detector head 47, the earliest signal stored on drum 32 is erased by head 48. Thus, the information stored on drum 32 continuously and progressively changes as the boat 10 transports source 11 and spread 12 along a given traverse. At any given time, the signals from the eight most recent seismic disturbances are retained on the drum.

The signals from the playback head selector are applied by way of a demodulator 56 to a mode switch 57 and by way of amplifier 58 to the second recording transducer 50. The signals applied to the playback head selector are added together so that a composite signal of selectable character will appear at the output of amplifier 58. Thus a composite signal, for example of the eight most recent disturbances, will be recorded on the second track by transducer 50.

Eight composite signals will then be recorded on the second track in the spacing between transducer 50 and reproducer head 51. The composite signals on the second track are then detected by reproducer 51 and applied by way of a demodulator 60 to the mode switch 57. The two signals from the mode switch 57 are then applied by way of channels 61 and 62 to a mixer and amplifier unit 63. Depending upon the selection made in the mode switch, the output of the mixer-amplifier 63 may comprise either the output of the playback selector 55 or the combination of such output with the output of demodulator 60. Stated otherwise, composite signals will be applied to terminal D which are representative of any number of from one to eight signals, or twice that number. In the system shown, a maximum operation will involve the production of a composite signal representative of the sum of time-separated signals resulting from the sixteen most recent seismic disturbances.

The composite signal appearing at terminal D', FIG. 1B, is applied by way of writing amplifier 70 to a conductive spiral 73 mounted on the periphery of a drum 72. The edge of a writing electrode 71 is positioned adjacent to the periphery of a cylinder 72. Elements 71—73 comprise units of an electrosensitive recorder wherein an electrosensitive paper chart 74 is driven by a motor 75 over the surface of the cylinder 72, the movement of the chart being in the direction of arrow 76, with movement of the surface of the cylinder 72 preferably in the same direction. The cylinder 72 is driven by motor 77 so that a point on the helix adjacent to the edge of the electrode 71 moves across the chart 74 at a uniform speed thus serving to scan chart 74 linearly with respect to time. As the time variable composite signal from amplifier 70 is applied to spiral 73, a current flow or discharge between the electrode 71 and spiral 73 is produced which marks the chart 74 to provide a visual indication of the composite signal.

In accordance with the present invention, the rotation of the cylinder 72, carrying the spiral 73, and drum 32 are synchronized so that there is coincidence between (1) the instant of generation of each seismic disturbance, (2) the beginning of a scanning cycle by helix 73, and (3) the reproduction of the time-separated signals stored on drum 32.

More particularly, there is provided a firing cam 80 mounted on shaft 81 which is driven by motor 77. A switch 82 in the control circuit of a firing gate 83 serves to complete a circuit through the firing gate 83 so that a firing pulse may pass therethrough. Firing pulses are generated by means of a pulse generator 84 driven from shaft 81. A magnetic pickup unit 85 comprising a coil wound on a magnetic core applies the signal thus generated to an amplifier 86 from which shaped pulses are provided. Output pulses from amplifier 86 are applied by way of channel 87 to the input of the firing gate 83. Preferably, firing cam 80 will close switch 82 once for each cycle that the spiral 73 scans chart 74. The pulse generator 84, 85 thus provides time base pulses shaped in amplifier 86. The time base pulses preferably have a repetition rate of about 10 pulses per second. One such pulse, the one occurring during closure of switch 82, is applied by way of channel 89 to a pulser unit 90. Pulser unit 90, essentially a power amplifier and pulse shaper, applies a sharp, high power pulse by way of channel 91 to terminal E. This pulse then is applied from terminal E', FIG. 1A, to channel 14 and thence to a spark plug-type igniter (not shown) in source 11.

The motor 75 driving chart 74 is so regulated as to provide a scale along the direction of arrow 76 which is representative of the movement of the boat 10 along a selected traverse, or, alternatively, is representative of time. The motor 75 may thus be driven by a position-controlled surveying apparatus or may be driven from an independent source with an operator providing indications of known stations along said traverse.

While it would be possible to drive both the drum 32 and the cylinder 72 from a single motor suitably geared to provide desirable speed ratios, applicant prefers to employ separate drive units. Such being the case, it is necessary to provide synchronization between the temporary storing unit 31 and the permanent recording unit including the cylinder 72. The speed fixing system of the present invention has, for reference, a precision frequency standard 100 preferably in the form of a tuning fork oscillator. The output of the oscillator 100 is applied by way of a power amplifier 101 and channel 102 to the helix drive motor 77. The output of the oscillator 100 is also applied by way of channel 103 to the input of a phase detector 104. The second input of the phase detector is a signal derived from a tone generator 105 which is driven by motor 33, FIG. 1A. The output of the tone generator 105 is applied by way of channel 106 to terminal A and thence from terminal A', FIG. 1B, and amplifier 107 to a scaler unit 108 whose output is applied by way of channel 109 to phase detector 104.

The frequency standard 100 is selected to provide an output which bears a non-harmonic relationship with respect to conevntional power frequencies such as 60 cycle power so that there will be a minimum of reinforcement of unwanted signals in the repetitive recording reproducing operations in the unit 31. More particularly, the signal appearing at the output of amplifier 101 is selected to have a frequency of 44.9 cycles per second and is provided with sufficient power at the output of power amplifier 101 to drive the motor 77. The second harmonic of the same signal, i.e., a signal of 89.8 cycles per second, is applied by way of channel 103 to the phase detector 104. The tone generator 105 driven by motor 33, FIG. 1A, in a prefererd embodiment of the invention has an output frequency of 179.6 cycles per second. The latter signal, applied to amplifier 107 and scaler 108, is reduced to a frequency at the output channel 109 of scaler 108 of 89.8 cycles per second. The output of phase detector 104 is a D.C. voltage proportional in magnitude to the difference between the frequencies of the signals from sources 100 and 105 and of sign dependent upon the sense of such difference. The voltage from amplifier 110 is then applied by way of channel 111 to the control terminal of multivibrator 112. Multivibrator 112, under the control of the output voltage from amplifier 110, generates an A.C. signal which is applied by way of channel 113, power amplifier 114 and channel 115, to motor 33. Thus there is provided a speed controlled feedback loop in which the motor 33 causes a signal to be generated, which signal is compared with the output signal from the frequency standard 100.

Figure 2:
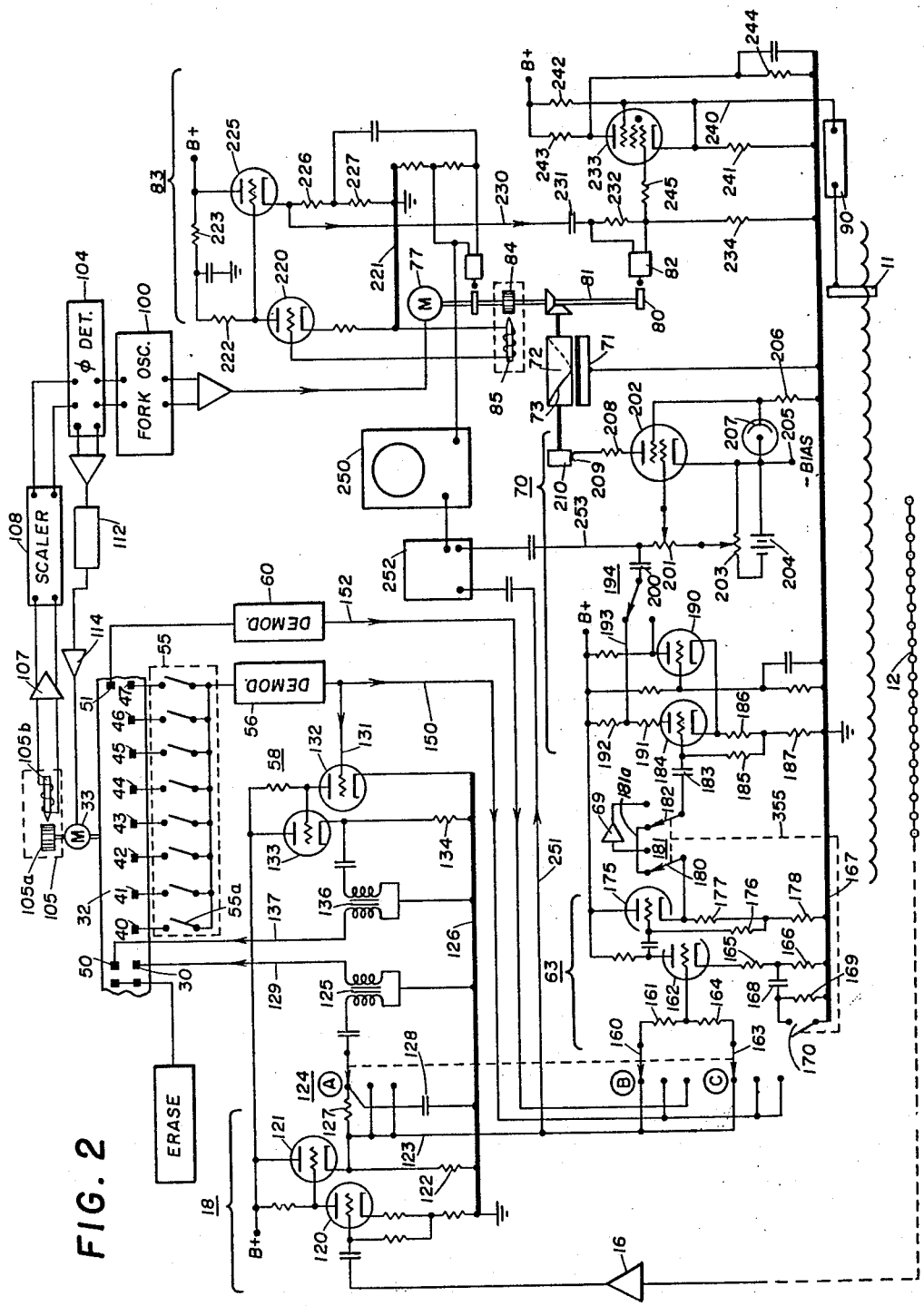
FIG. 2 is a more detailed circuit diagram of the system of FIGS. 1A and 1B.

Referring now to FIG. 2, the system which has been above described is illustrated in greater detail. Where consistent, like parts have been given the same reference characters as in FIG. 1A and FIG. 1B.

Acoustic pulses from source 11 are detected by detector spread 12. The resultant signals are applied by way of amplifiers 16 and 18 to the input recording head 30. Amplifier 16, a conventional seismic amplifier, is preferably provided with filters which may be employed to select the frequency band of signals to be recorded. The amplifier 18 includes an input tube 120 having the output of amplifier 16 applied to the control grid thereof. Tube 120 is coupled at the anode thereof directly to the control grid of a cathode follower tube 121. The signal appearing across the cathode resistor 122 is then applied by way of conductor 123 to the second and third terminals of Section A of a three pole or section, three position selector switch 124. The output signal is also applied to the first terminal of Section B of switch 124 and to the first terminal of Section C of said switch. The selector arm of Section A of switch 124 is connected by way of a coupling capacitor to the primary winding of a transformer 125. The secondary winding of transformer 125 is connected at one terminal to the ground bus 126 and at the other terminal to a conductor 129 which is connected to recording head 30. Thus, signals from spread 12 are amplified in amplifier 18, and, on either position 2 or 3 of switch 124, are applied to recording head 30. In position 1, the cathode of tube 121 is connected through a high resistance to the first terminal of Section A of switch 124 which in turn is connected via condenser 128 to ground. Resistance 127 effectively disconnects the recording head from tube 121, the signal being connected directly to Sections B and C for operation hereinafter to be described.

Signals recorded on drum 32 by recording head 30 are detected by pickup heads 40—47. With all the switches such as switch 55a in the playback head selector 55 in closed position, the sum of eight signals will be applied to the demodulator 56. The output of demodulator 56 is applied by way of conductor 131 to the control grid of an amplifier tube 132. The anode of tube 132 is connected directly to the control grid of a cathode follower tube 133. The signal voltage appearing across the cathode resistor 134 is then applied by way of a coupling capacitor to the primary winding of a transformer 136. Secondary winding of transformer 136 is connected at one terminal to the ground bus 126 and at the other terminal to a conductor 137 which is connected to the second recording head 50 on drum 32.

The signal at the output of demodulator 56 is also applied by way of conductor 150 to the second terminal of Section B and to the second and third terminals of Section C of the switch 124.

Signals recorded on drum 32 by recording head 50 are detected at pickup head 51 and applied to a demodulator 60. The output of demodulator 60 is applied by way of conductor 152 to the third terminal of the Section B of switch 124.

In the system thus far described, signals from detector spread 12 are recorded initially by recording head 30. Each signal is reproduced a plurality of times as it passes pickup heads 40—47. The sum of a selected sequence of the signals detected by pickup heads 40—47 is applied by way of amplifier 58 to the second recording head 50. The signals recorded by recording head 50 are detected by pickup head 51 and applied to demodulator 60. The signals from both demodulators 56 and 60 are applied to Sections B and C of the selector switch 124.

In Section A of switch 124 is the input to the drum 32 and Sections B and C are the outputs thereof. Selector switch 124 in the first position applies the signal from the cathode of tube 121 directly to selector arms 160 and 163 which are in the input circuit of a mixer-amplifier 63, thus by-passing the storage drum 32.

In position 2 signals from the cathode of tube 121 are applied through Section A of switch 124 to the recording head 30. The output from demodulator 56 is applied to selector arms 160 and 163 so that there will be applied to mixer-amplifier 63 only those signals recorded on Track 1 of drum 32.

In position 3 signals are applied from the cathode of tube 121 to the recording head 30. Signals from demodulator 56 are applied to selector arm 163, and signals from demodulator 60 are applied through Section B of switch 124 to selector arm 160.

The signals appearing on selector arms 160 and 163 are applied to the control grid of tube 162 by way of mixing resistors 161 and 164, respectively, the control grid of tube 162 being connected to the juncture between resistors 161 and 164.

The cathode of tube 162 is connected by way of series resistors 165 and 166 to ground bus 167. The juncture between resistors 165 and 166 is connected by way of condenser 168 and series resistor 169 to the ground bus 167. Switch 170 is connected across resistor 169 and is adapted selectively to short-circuit the latter resistor and change the amplification of signals in tube 162.

The anode of tube 162 is connected directly to the control grid of a cathode follower tube 175. The control grid of tube 175 is connected by way of resistor 176 to the juncture between cathode resistors 177 and 178. The cathode of tube 175 is connected to one selector arm 180 of a double pole, double throw switch 181. Conductor 181a serves to interconnect the first terminals of the switch 181. Thus, in a first position, a signal from tube 175 passes directly from input selector arm 180 to output selector arm 182 and thence by way of condenser 183 to the control grid of the first tube 184 of writing amplifier 70. In the second position of selector arms 180 and 182 the signal passes through an A.V.C. amplifier 69 which is shown in detail in FIG. 3.

In the writing amplifier 70 the control grid of tube 184 is connected through resistor 185 to the juncture between cathode resistors 186 and 187. The cathode of tube 184 is coupled directly to the cathode of tube 190. The juncture between anode resistors 191 and 192 is connected by way of conductor 193 to a first terminal of a single pole, double throw switch 194. The anode of tube 190 is connected directly to the second terminal of said switch 194 which provides for reversal of polarity of the signal fed to succeeding circuits and ultimately to the recorder unit.

The selector arm of switch 194 is connected by way of capacitor 200 and potentiometer 201 to the control grid of an output tetrode 202. The control grid of tube 202 is connected to the cathode by way of a biasing network which includes potentiometer 203 and biasing battery 204. The grid-cathode potential for tube 202 may be varied by adjusting potentiometer 203. The cathode of tube 202 is connected to a terminal 205 which is of high negative potential relative to the ground bus 167. The screen grid of tube 202 is connected by way of resistor 206 to ground bus 167 and by way of gas discharge tube 207 to the cathode. The anode of tube 202 is connected by way of resistor 208 to a brush 209 which makes electrical contact with a slip ring 210. Slip ring 210 rotates with the drum 72 and is connected electrically to the conductive spiral 73. The writing electrode 71 which cooperates with spiral 73 is connected to the ground bus 167.

By means of the system thus described, signals from spread 12 may be composited in the operation of drum 32. Composite signals pass through mixer-amplifier 63 and writing amplifier 70 and are applied to the spiral 73 to produce current discharges between the spiral 73 and the writing electrode 71.

The speed fixing system in FIG. 2 is the same as shown in FIGS. 1A and 1B wherein motors 77 and 33 are controlled primarily by frequency standard such as a fork oscillator 100. The tone generator 105 includes a toothed wheel 105a which cooperates with a magnet pickup unit 105b, a coil wound on a magnet core, to produce pulses at the input of amplifier 107 at a rate proportional to the revolution of the drum 32. The firing function is performed by the action of the pulse generator 84, 85. Toothed wheel 84 cooperates with a magnet pickup 85, which comprises a coil wound on a magnet core, to produce pulses at the rate of ten pulses per second or thirty pulses for each revolution of the cylinder 72.

Pulses from pickup 85 are utilized in the grid cathode circuit of tube 220 in the firing gate 83. The cathode of tube 220 is connected through a resistor to a ground bus 221. The anode is connected by way of load resistors 222 and 223 to a source of positive potential. The anode of tube 220 is connected directly to the control grid of tube 225 which is a cathode follower. The cathode of tube 225 is connected by way of resistances 226 and 227 to ground bus 221. Voltage pulses, generated at the rate of ten pulses per second and appearing at the cathode of tube 225, are applied, by way of conductor 230 and condenser 231 and resistor 232, to the control grid circuit of thyratron 233. The control grid of tube 233 is connected by way of resistor 234 to the ground bus 167. Resistor 232 is adapted to be short-circuited by switch 82 under the control of the reference cam 80. Resistance 232 is of very high impedance compared to the impedance in the circuit between the cathode of tube 225 and ground. Thus, the control grid of tube 233 will not be affected substantially by voltage pulses from tube 225 so long as switch 82 is open. Closure of switch 82 applies a short circuit across resistor 232. As a result, a selected voltage pulse appearing at the cathode of tube 225 is applied to the control grid of tube 233 to fire the thyratron 233. The output of thyratron 233 comprises a single, short voltage spike which appears across cathode resistor 241 and is applied, by way of conductor 240 and power amplifier 90, to the firing terminal of the source 11. In operation, one pulse in each cycle of cylinder 72 is selected from pickup 80b by the cam 84 for firing source 11 at instants which have a predetermined relationship with respect to the passage of spiral 33 along the length of writing electrode 71.

Tube 233 is connected at the cathode thereof to ground bus 167 by way of resistor 241, to the screen grid by way of conductor 240, and to the B+ terminal by way of resistor 242. The anode of tube 233 is connected to the B+ terminal by way of resistor 243 and to ground by way of the R-C network 244. A resistor 245 is connected between the control grid of tube 233 and the juncture between resistors 232 and 234. Voltage pulses developed at the cathode of tube 233 are applied to source 11 by way of conductor 240 and pulse amplifier 90.

While the system thus far described provides for compositing signals and recording the same on a chart driven over cylinder 72, means are also provided for visually monitoring the operations of the system by signals presented for display on a cathode-ray oscilloscope 250. More particularly, signals appearing on the input channel of the recording drum 32, i.e., on conductor 123, are applied by way of conductor 251 to one input of an electronic switch 252. Signals to be applied to the spiral 73 are applied by way of conductor 253 to a second input terminal of switch 252, the conductor 253 being connected to the juncture between capacitor 200 and potentiometer 201 in the writing amplifier 70. Thus input signals and output signals may be portrayed on the face of oscilloscope 250. It will be appreciated that either conductors 251 or 253 may be impermanently connected and may comprise test probes which may be applied to any desired point in the system for testing purposes such as in connection with the initial alignment of the recording pickup heads, the control cams and the tone generators.

Figure 3:
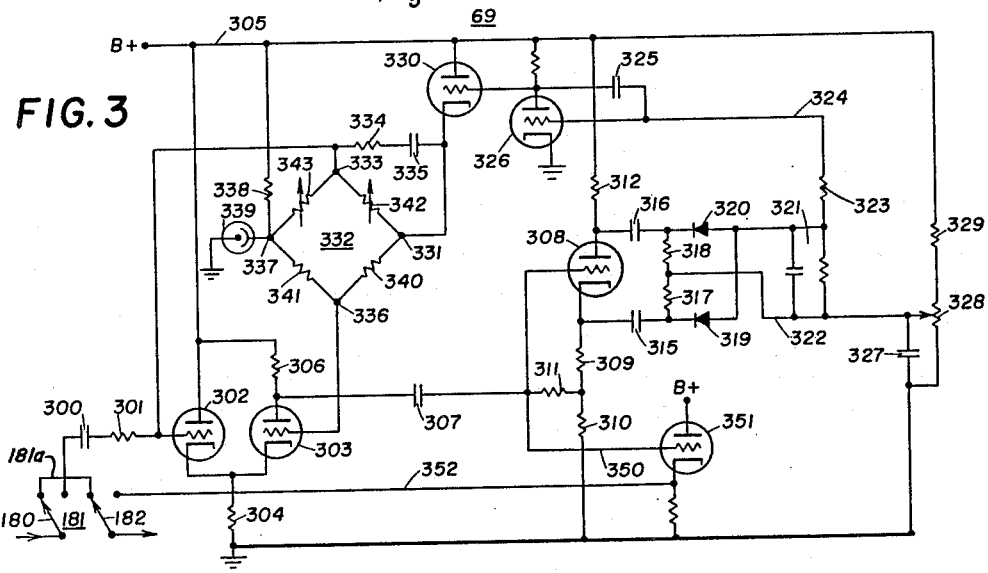
FIG. 3 is a circuit diagram of an amplifying channel from FIG. 2.

Referring now to FIG. 3, there is illustrated in detail the circuit diagram of the A.V.C. amplifier 69. Input signals applied to the switch 181 will pass through amplifier 69 when switch arms 180 and 182 are in the right hand position. Input signals are applied to amplifier 69 by way of condenser 300 and resistor 301, the latter resistor being connected to the control grid of tube 302. The cathode of tube 302 is connected directly to the cathode of tube 303 and to ground by way of resistor 304. The anode of tube 302 is connected to B+ bus 305 and by way of resistor 306 to the anode of tube 303. The signal from the anode of tube 303 is applied by way of condenser 307 to the control grid of a phase splitter tube 308. The cathode of tube 308 is connected by way of series resistors 309 and 310 to ground. Resistor 311 interconnects the grid of tube 308 and the juncture between resistors 309 and 310. The anode of tube 308 is connected by way of resistor 312 to the B+ bus 305.

The signals appearing at the anode and cathode of tube 308 are rectified to produce a D.C. control voltage which is fed back to tubes 302 and 303. More particularly, capacitors 315 and 316 couple the cathode and anode, respectively, to series resistors 317 and 318. Rectifiers 319 and 320 rectify signals appearing across resistors 317 and 318 and apply the rectified signal to the upper terminal of the R-C network 321. The juncture between resistances 317 and 318 is connected to the other terminal of the R-C network 321 by way of conductor 322. The upper terminal of network 321 is connected by way of resistor 323 and conductor 324 to the control grid of a tube 326. Capacitor 325 is connected between the control grid and the anode of tube 326. The lower terminal of network 321 is connected to one terminal of capacitor 327, the other terminal thereof being connected to ground. A potentiometer 328, whose variable tap is connected to conductor 322, is connected at one terminal to ground and at the other terminal to a resistor 329 which leads to B+ bus 305.

A D.C. voltage, proportional in magnitude to the rectified signal, is applied to amplifier tube 326, the cathode of which is connected to ground and the anode thereof connected directly to the control grid of tube 330. The cathode of tube 330 is connected to terminal 331 of a bridge 332. Terminal 333 of bridge 332 is connected to the control grid of tube 302. A series circuit including resistor 334 and condenser 335 connects terminal 333 to the cathode of tube 330. Terminal 336 of bridge 332 is connected to the control grid of tube 303. Terminal 337 of bridge 332 is connected by way of resistor 338 to B+ bus 305, and by way of gas tube 339 to ground. Two bridge arms comprise fixed resistors 340 and 341 of like impedance.

The other bridge arms comprise resistors 342 and 343 of non-linear conductive characteristics. More particularly, the latter resistors in one embodiment of the invention were thyrites having higher resistance to low level signals than to high level signals.

The voltage from tube 330 applied to the bridge 332 serves to reduce the impedances of non-linear elements 342 and 343 so that signals on the grid of tube 302 are controllably shunted. Additionally, a portion of the control voltages appearing at the cathode of tube 330 is applied to the control grids of tubes 302 and 303 by way of connections to points 333 and 336, respectively. The control voltages as applied to the differential amplifier comprising tubes 302 and 303 are then mutually nullified and are not applied to condenser 307. On the other hand, signals are applied to output condenser 307 and are maintained at a substantially constant level, the time response of the control system being fixed by the resistor 323 and condenser 325. The controlled signal applied to tube 308 is also applied by way of conductor 350 to the control grid of a cathode follower output tube 351. The cathode of tube 351 is connected by way of conductor 352 to the output terminal of switch 181.

Thus there is provided means for limiting the magnitude of the signal voltage applied to the writing spiral 73. When the A.V.C. system is employed, i.e., with switch 181 in the right hand position, an increased gain is desired to operate the A.V.C. circuit. For this purpose a common link 355 is provided between switch 181 and switch 170. When switch 181 is in the right hand position, switch 170 is closed, applying a short circuit across resistor 169 so that the gain in the stage comprising amplifier tube 162 is substantially higher than when switch 170 is open. In practice, it has been found that an increase in gain by a factor of five is desired. For this purpose, resistances 165, 166 and 169 are so selected to provide the above relationship.

Figure 4:
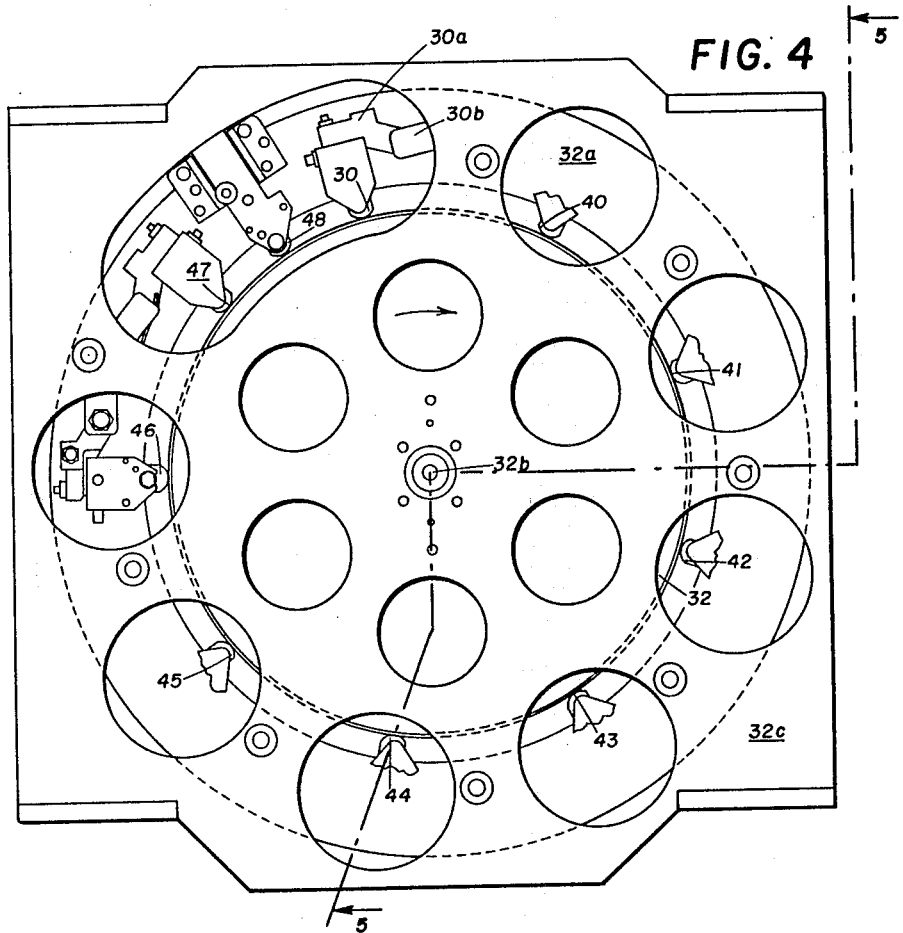
FIG. 4 is a view of a temporary storing system.
Figure 5:
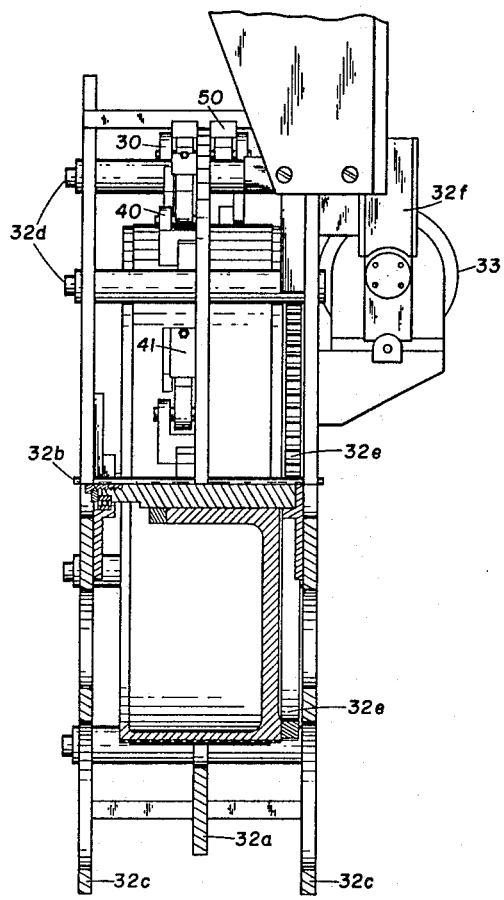
FIG. 5 is a view of FIG. 4 taken along the line 5—5 thereof.

FIGS. 4 and 5 illustrate some of the structural features of a temporary storing system including the drum 32. The periphery of drum 32 may be seen in FIG. 4 with the recording and pickup heads of the first track visible. With the drum rotation in a clockwise direction, the input recording head 30 is positioned adjacent to the periphery of the drum 32 and is supported on a spring-biased bracket 30a which is mounted by a holder 30b secured to a mounting ring 32a. The detector heads 40—47 are similarly mounted from the ring 32a at uniformly spaced points about the periphery of drum 32. The erase head 48 is positioned between detector head 47 and recording head 30. Drum 32 is journaled for rotation on shaft 32b within the frame member 32c.

Signals recorded on the surface of the drum 32 are successively detected by the detector heads 40—47, the outputs of the detector heads being connected as illustrated in FIG. 2.

Referring to FIG. 5, which is shown partially in section, two frame members 32c are maintained in a fixed relation by a plurality of spacer bolts 32d. The mounting ring 32a is supported by bolts 32d, and in turn supports the recording, playback and erasing heads. Transducers 40 and 30 may be seen on the left hand side of the ring 32a whereas the recording head 50 may be seen on the right hand side of the ring 32a. Motor 33 is geared to the drum 32 by means of a ring gear 32e, a suitable speed reducer 32f being provided to set the drum speed at a desired level. The tone wheel 105a of FIG. 2 is not shown in FIG. 5, but is coupled to motor 33 by means of an idler gear riding on the ring gear 32e.

Figure 7:
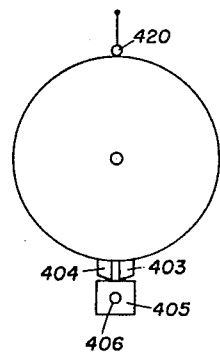
FIG. 7 is an end view of the compositor of FIG. 6.
Figure 6:
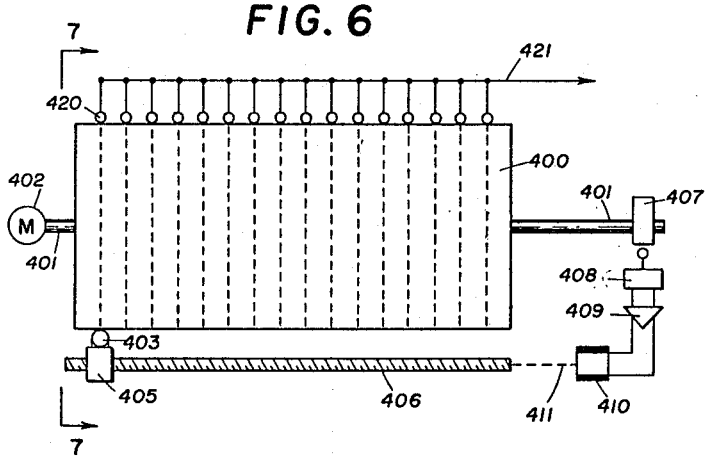
FIG. 6 illustrates a modified compositing system.

FIGS. 6 and 7 illustrate an alternative recording system which, in contrast to the drum 32 with heads spaced about the periphery, is provided with a recording head which may be moved along the length of a drum. More particularly, drum 400 mounted on a shaft 401 is driven by motor 402. A recording head 403 and an erase head 404 (FIG. 7) are mounted on a traveling nut 405, which is supported by a threaded shaft 406. A cam 407 (FIG. 6) mounted on shaft 401 actuates a switch 408 which is in the control circuit of a pulsing unit 409. The output of the pulsing unit 409 includes a stepping ratchet means including a relay 410. Relay 410 is coupled, as indicated by the dashed link 411, to the threaded shaft 406. The operation of the system is such that for every revolution of drum 400 the record head 403 and erase head 404 will be stepped to a new recording track along the length of the drum 400.

In the form shown sixteen tracks are employed. Associated with each such track is a reproducing head such as the head 420. Each reproducing head is connected to an output bus 421 so that signals detected from the drum 400 will be summed and available for application to a permanent type recording means.

In a preferred mode of operation, the record head 403 is moved along the length of the drum 400 in steps to record on alternate tracks. By this means the head would be stepped from the position shown across the face of the drum, recording on every other track. It would then be stepped back in the opposite direction to record on the intermediate tracks. Following such a program, the signals recorded on drum 400 would be continuously changing. More particularly, on each revolution of drum 400, signals from the most recent seismic disturbance would be recorded while the oldest signal on the drum is being erased. Cam 407 preferably is so set as to step the record head 403 from one track to another during a limited time interval immediately preceding the initiation of each seismic disturbance. A firing circuit may be operated in response to cam 407 or by a system such as shown in FIG. 2.

An alternative mode of operation involves stepping the record head 403 across the drum while recording on each track. When a signal has been recorded in the last track, the recording head would be stepped back the entire length of the drum to repeat the same cycle. In any event, a seismic source and detecting system are continuously moved along a traverse to produce one disturbance at each of a plurality of spaced locations. Signals generated upon detection of each seismic disturbance temporarily are stored. Output signals are then produced by combining the recorded signals in predetermined time relation with the initiation of each disturbance, the combination of signals forming such output signals resulting from predetermined sequences of the disturbances wherein each sequence bears the same relation with respect to the most recent disturbance. The output signals are then recorded in correlation with the points of generation of the seismic disturbances.

The speed at which the magnetic recording medium is driven relative to a recording or detecting head will depend upon the fidelity desired, and in some cases upon the pulse repetition rate. It is to be noted that in FIG. 2 provision has been made in unit 108 for scaling the signal from the tone generator 105. The scaler 108 is provided in order to permit two different recording speeds on the drum 32. A slow drum speed may be employed wherein seismic impulses are generated every three seconds. When this is the case, signals from the tone generator 105 have a frequency of 89.8 cycles per second. When it is desired to operate at a higher seismic pulse rate, for example a pulse every one and one-half seconds, the drive to the drum 32 is modified so that the output signal from the tone generator 105 is 179.6 cycles per second. The latter signal is then applied to the scaler 108 so that the output may be applied to the phase detector 104 for generation of an output signal which may be employed to control the speed of the drum 32.

In the operation of the present system it will now be seen that a repetitive seismic source and detector are moved in a fixed spaced-apart relation along the surface of a zone to be explored. There is generated a set of seismic functions by the detector which represents return to the surface of acoustic waves which have been reflected from subsurface interfaces. From the set of seismic functions thus produced and occurring serially in time there is formed, by storing and reproducing each member of the set of functions, a sequential collection of subsets of functions. The subset comprises a predetermined sequence of the reflected seismic waves, which sequence is effectively moved through the set of seismic functions as a simple moving average operation. Members of each of the subsets are then combined to produce an output signal, which output signal is recorded in the order of the occurrence of the subsets in the set of functions.

It will be noted that the storage systems illustrated in

FIGS. 2 and 6 are of the magnetic drum type. They are representative of storage systems suitable for carrying out the present invention. In general, those systems are suitable which are capable of accepting seismic signals in phonographically reproducible form as that term is known in seismic exploration and as used in Rieber Patent No. 2,144,812. Storage in reel form, as contrasted with drum storage, may be employed where data is to be supplied from the field to a central processing center for the sequential collection of subsets of seismic functions obtained in the course of field operations.

The combination of members of each subset plotted, for example, on chart 74, FIG. 1B, provides a three-dimensional representation of the acoustic properties of the zone over which the exploration is conducted. Points along the length of the chart 74 represent the position of the source-detector system. The position may be based alone on time if motor 75 is controlled by the time control 340 by way of switch 342 and conductor 343. Alternatively, through the use of a position surveying system accompanying the exploring system, the length of the chart may be directly in terms of the exact position of the exploring system. Such control generically is represented by the position control unit 341 of FIG. 1B.

The dimension along the width of the chart 74 is a scaled representation of the time of travel of the acoustic waves to and from subsurface reflecting horizons. The intensity or the displacement of the signal at any time point along the width of the chart represents the amplitude of the signals from the detectors. By this means, a graphic portrayal or seismic cross section may be provided.

While the invention has been described in connection with certain specific embodiments thereof, it will now be understood that further modifications will suggest themselves to those skilled in the art and it is intended to cover such modifications as fall within the scope of the appended claims.

What is claimed is:

1. A seismic exploring system including a source of seismic waves, detector means maintained in predetermined relation with respect to said source for generating signals corresponding to waves from said source, a recorder including writing means adapted cyclically to scan a recording medium, means for repetitively initiating generation of sismic waves by said source at fixed time intervals and in predetermined time relation with respect to each scanning cycle of said writing means, a temporary signal storing medium, transducer means connected to said detector means for impressing said signals on said storing medium, reproducer means for simultaneously detecting a plurality of the stored signals, and means for combining and applying signals from said reproducer means to said writing means.

2. A seismic exploring system including a source of seismic waves, detector means maintained in predetermined relation with respect to said source for generating signals corresponding to waves from said source, a recorder including writing means adapted cyclically to scan a recording medium, means for repetitively initiating generation of seismic waves by said source at fixed time intervals and in predetermined time relation with respect to each scanning cycle of said writing means, a temporary signal storing medium, transducer means connected to said detector means for impressing said signals on said storing medium, reproducer means spaced uniformly along said medium for detecting a plurality of the stored signals, and means for moving a point on said storing medium at uniform speed from registration with a reproducer means to registration with a reproducer means each time said recording medium is scanned, and means for combining and applying signals from said reproducer means to said writing means.

3. A continuous seismic off-shore exploring system comprising a signal storing drum having a plurality of transducers including a recording means and pickup means uniformly spaced about the periphery thereof, erasing means between the last pickup means and said recording means, a recorder including writing means adapted cyclically to scan a recording medium along one dimension thereof uniformly with time, an acoustic source adapted to be repetitively energized upon application thereto of a control pulse, acoustic detectors positioned in predetermined relation with respect to said source and connected to said recording means, means for moving said source and said detectors along a predetermined traverse while acoustically coupled to the earth, means for driving said recording medium past said writing means along a second dimension thereof in proportion to the movement of said source along said traverse, means for repetitively generating control pulses each in predetermined time relation with respect to the beginning of a cycle of scanning of said recording medium by said writing means and for driving said drum at a uniform speed for movement of the periphery thereof a distance equal to the spacing between said transducers during each time interval between control pulses, means for combining signals produced by said pickup means to produce output signals, and means for applying said output signals to said writing means.

4. In a seismic exploring system in which a seismic source and a detector are moved in a fixed spaced apart relation along the surface of a zone to be explored, the combination which comprises control means for said source for producing repetitive time-spaced control signals for energizing said source for generating acoustic waves which travel downwardly and are reflected back to said detector from subsurface interfaces, means for effecting storage serially and in reproducible form of a set of time-spaced functions wherein each function is representative of those acoustic waves which arrive at said detector in the interval between two of said control signals, a plurality of reproducing means for simultaneously reproducing functions of selected like sequences of said set of functions at each of a plurality of time points, the spacing between said time points corresponding with the time-spacing of said control signals, means for combining said like sequences to produce output signals, and means for recording said output signals.

5. A system for seismic exploration which comprises a source and a plurality of detectors in fixed space relation, means for moving said source and detectors along a path adjacent a surface of a zone to be explored, means in circuit with said source for periodically energizing said source to produce a series of equally time-spaced seismic impulses for travel between the source and detectors by way of the zone to be explored, said detectors being responsive to seismic impulses arriving at the detectors after travel through the zone for producing electrical signals representative of the character of the impulses, means coupled to said detectors for storing in sequences signals produced by said detectors, a plurality of signal-sensing means equally spaced from one another and operatively associated with said storing means, means for moving said stored signals past said signal-sensing means at a rate such that said signals arrive in sequence at each sensing means at a time related to the production of each seismic impulse, signal-combining means, and means connecting selected ones of said sensing means with said combining means for applying to said combining means selected combinations of said signals wherein at least one signal of each combination is common to at least one other combination.

6. A system for off-short seismic exploration of a zone having a surface which is covered with water which comprises a source and detector in fixed spaced relation, means for moving said source and detector along a path adjacent the water covering the surface of the zone to be explored, means in circuit with said source for periodically energizing said source to produce a series of equally time-spaced seismic disturbances for travel between the source and detector by way of reflection paths from subsurface strata, said detector being responsive to reflected seismic disturbances arriving at the detector for producing electrical signals representative of the character of the disturbances, means responsive to said signals for compositing selected sequences of said signals wherein at least one signal in each sequence is common to at least one other sequence, and means coupled to said compositing means for timing the composites of said signals as a measure of the depths of subsurface strata giving rise to said reflections.

7. The method of measuring the selected characteristics of a material which comprises periodically generating an initiating signal to create a series of equally time-spaced initiating signals, producing second signals representative of said selected characteristics of the material being measured and arising by reason of said initiating signals, selecting said second signals occurring in a fixed time segment which includes at least two of said initiating signals one of which is the most recent initiating signal occurring in that time segment, combining said second signals to form a composite signal, shifting the fixed time segment to include the initiating signal following the aforementioned most recent initiating signal, again selecting second signals occurring in the shifted time segment employing the same basis for selection as the previous selection of second signals, and combining the selected second signals to produce a series of composite signals enhancing the representation of the characteristic being measured.

References Cited in the file of this patent
UNITED STATES PATENTS

| | | |
|---|---|---|
| 2,610,226 | Klaasse | Sept. 9, 1952 |
| 2,610,244 | Wolf | Sept. 9, 1952 |
| 2,623,116 | Rymes | Dec. 23, 1952 |
| 2,652,530 | Davidson | Sept. 15, 1953 |
| 2,729,803 | Harrison | Jan. 3, 1956 |
| 2,795,287 | Sharpe | June 11, 1957 |
| 2,849,076 | Kaufman | Aug. 26, 1958 |
| 3,045,207 | Peterson | July 17, 1962 |
| 3,065,815 | Hersey et al. | Nov. 27, 1962 |

---

UNITED STATES PATENT OFFICE

CERTIFICATE OF CORRECTION

Patent No. 3,124,781             March 10, 1964

George B. Loper et al.

It is hereby certified that error appears in the above numbered patent requiring correction and that the said Letters Patent should read as corrected below.

Column 1, line 18, strike out "changes"; line 32, for "distrubances" read -- disturbances --; column 4, line 59, for "conevntional" read -- conventional --; line 70, for "prefererd" read -- preferred --; column 11, line 46, for "sismic" read -- seismic --; column 12, line 69, for "off-short" read -- off-shore --.

Signed and sealed this 15th day of September 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,124,781                        March 10, 1964

George B. Loper et al.

It is hereby certified that error appears in the above numbered patent requiring correction and that the said Letters Patent should read as corrected below.

Column 1, line 18, strike out "changes"; line 32, for "distrubances" read -- disturbances --; column 4, line 59, for "conevntional" read -- conventional --; line 70, for "prefererd" read -- preferred --; column 11, line 46, for "sismic" read -- seismic --; column 12, line 69, for "off-short" read -- off-shore --.

Signed and sealed this 15th day of September 1964.

(SEAL)
Attest:

ERNEST W. SWIDER
Attesting Officer

EDWARD J. BRENNER
Commissioner of Patents